(12) United States Patent
Lienhard et al.

(10) Patent No.: US 10,626,037 B2
(45) Date of Patent: Apr. 21, 2020

(54) CONCENTRATING AQUEOUS SOLUTIONS VIA HYBRIDIZING ELECTRODIALYSIS AND OTHER DESALINATION TECHNIQUES

(71) Applicant: Massachusetts Institute of Technology, Cambridge, MA (US)

(72) Inventors: John H. Lienhard, Lexington, MA (US); Kishor Govind Nayar, Cambridge, MA (US); Ronan K. McGovern, Cambridge, MA (US); Bader Al-Anzi, Kuwait (KW)

(73) Assignee: Massachusetts Institute of Technology, Cambridge, MA (US)

( * ) Notice: Subject to any disclaimer, the term of this patent is extended or adjusted under 35 U.S.C. 154(b) by 91 days.

(21) Appl. No.: 16/117,471

(22) Filed: Aug. 30, 2018

(65) Prior Publication Data

US 2019/0062189 A1    Feb. 28, 2019

Related U.S. Application Data

(60) Provisional application No. 62/552,456, filed on Aug. 31, 2017.

(51) Int. Cl.
*B01D 61/02*    (2006.01)
*B01D 61/14*    (2006.01)
(Continued)

(52) U.S. Cl.
CPC ............. *C02F 9/00* (2013.01); *B01D 61/022* (2013.01); *B01D 61/58* (2013.01); *B01D 61/025* (2013.01);
(Continued)

(58) Field of Classification Search
CPC .. B01D 61/022; B01D 61/025; B01D 61/027; B01D 61/145; B01D 61/44; B01D 61/58;
(Continued)

(56) References Cited

U.S. PATENT DOCUMENTS

| | | |
|---|---|---|
| 4,141,825 A | 2/1979 | Conger |
| 6,030,535 A | 2/2000 | Hayashi et al. |
| 2015/0251137 A1 | 9/2015 | Wallace |

OTHER PUBLICATIONS

Bitaw, T., et al, "Optimization on a new hybrid forward osmosis-electrodialysis-reverse osmosis seawater desalination process", Desalination, 398, pp. 265-281. (Year: 2016).*
(Continued)

*Primary Examiner* — Benjamin L Lebron
(74) *Attorney, Agent, or Firm* — Robert J. Sayre; Modern Times Legal

(57) ABSTRACT

An aqueous solution flows through a desalination system that separates the aqueous solution into purified water and concentrated brine. The concentrated brine is directed into an electrodialysis system that includes an anode and a cathode and at least two monovalent selective ion exchange membranes between the anode and the cathode. At least one of the monovalent selective ion exchange membranes separates at least one diluate channel from at least one concentrate channel in the electrodialysis system, and this membrane selectively allows at least one monovalent ion to pass through the membrane while blocking or inhibiting the transport therethrough of multi-valent ions. The concentrated brine flows through at least the concentrate channel while a voltage is applied to the anode and cathode; and additional aqueous solution flows through the diluate channel.

21 Claims, 5 Drawing Sheets

(51) Int. Cl.
*B01D 61/44* (2006.01)
*B01D 61/58* (2006.01)
*C02F 1/44* (2006.01)
*C02F 1/469* (2006.01)
*C02F 1/52* (2006.01)
*C02F 9/00* (2006.01)
*C02F 5/06* (2006.01)
*C02F 103/08* (2006.01)

(52) U.S. Cl.
CPC .......... *B01D 61/027* (2013.01); *B01D 61/145* (2013.01); *B01D 61/44* (2013.01); *B01D 2311/04* (2013.01); *B01D 2311/06* (2013.01); *B01D 2311/08* (2013.01); *B01D 2311/12* (2013.01); *B01D 2311/25* (2013.01); *B01D 2311/2642* (2013.01); *B01D 2311/2669* (2013.01); *B01D 2311/2673* (2013.01); *C02F 1/441* (2013.01); *C02F 1/442* (2013.01); *C02F 1/444* (2013.01); *C02F 1/4693* (2013.01); *C02F 1/52* (2013.01); *C02F 5/06* (2013.01); *C02F 2001/5218* (2013.01); *C02F 2103/08* (2013.01); *C02F 2301/046* (2013.01)

(58) Field of Classification Search
CPC ............ B01D 2311/04; B01D 2311/06; B01D 2311/08; B01D 2311/12; B01D 2311/25; B01D 2311/2642; B01D 2311/2669; B01D 2311/2673; C02F 1/441; C02F 1/442; C02F 1/444; C02F 1/4693; C02F 1/52; C02F 5/06; C02F 9/00; C02F 2001/5218; C02F 2103/08; C02F 2301/046
See application file for complete search history.

(56) References Cited

OTHER PUBLICATIONS

Bond, R., et al, "Zero liquid discharge desalination of brackish water with an innovative form of electrodialysis: electrodialysis metathesis", Florida Water Resources Journal, pp. 36-44. (Year: Jul. 2011).*
United States Patent and Trademark Office, International Search Report and Written Opinion for PCT/US2018/48932 (corresponding PCT application) (dated Nov. 26, 2019).
H. Ohya, et al., "Integrated system for complete usage of components in seawater," 134 Desalination 29-36 (2001).
Y. Tanaka, et al., "Ion-exchange membrane electrodialytic salt production using brine discharged from a reverse osmosis seawater desalination plant," 222 J. Memb. Sci. 71-86 (2003).
A. Gorenflo, et al., "System Design and Operation with Ultra-High Pressure Reverse Osmosis Spiral Wound Elements," Intl. Desalination Association World Congress (2017).

* cited by examiner

CONCENTRATING AQUEOUS SOLUTIONS VIA HYBRIDIZING ELECTRODIALYSIS AND OTHER DESALINATION TECHNIQUES

RELATED APPLICATION

This application claims the benefit of U.S. Provisional Application No. 62/552,456, filed 31 Aug. 2017, the entire content of which is incorporated herein by reference.

BACKGROUND

Forecasts project that, by 2050, there will be 9.6 billion people on the planet and that we will lack enough water resources around the world to sustain current consumption patterns. Seawater desalination, the only man-made process that generates new freshwater resources, is thus becoming increasingly important for the future of humanity. Today, an estimated 75 million people worldwide rely on seawater desalination for meeting their drinking water needs, and the figure is increasing at rate of approximately 10% annually. However, seawater desalination has an environmental impact. Every day, about 100 billion liters of seawater flows in to a desalination plant and 50 billion liters of salty brine is discharged in to the sea. Desalination brine discharged into the sea can adversely affect the marine environment near the discharge sites. One method of mitigating this negative impact is zero-discharge seawater desalination, where desalination brine is further concentrated to produce pure salt and additional drinking water.

Stand-alone electrodialysis (ED) systems have been deployed in Japan or concentrating seawater to produce salt. One of the biggest drawbacks hindering the adoption of ED technology for brine concentration has been the high capital costs of the system with the main market for the technology being limited to Japan currently.

SUMMARY

A method and apparatus for concentrating an aqueous solution via a hybridization of electrodialysis with another desalination technique, such as reverse osmosis, are described herein, where various embodiments of the apparatus and methods may include some or all of the elements, features and steps described below.

In a method for concentrating aqueous solutions using a hybridized combination of electrodialysis and another desalination technique (e.g., reverse osmosis), an aqueous solution is directed through a desalination system that separates the aqueous solution in purified water and concentrated brine. The concentrated brine is directed into an electrodialysis system (also referred to as an electrically driven separation apparatus). The electrodialysis system includes an anode and a cathode and at least two monovalent selective ion exchange membranes between the anode and the cathode. At least one of the monovalent selective ion exchange membranes separates at least one diluate channel from at least one concentrate channel in the electrodialysis system, and each monovalent selective ion exchange membrane selectively allows either a monovalent cation or anion to pass through the membrane while blocking or inhibiting the transport of non-monovalent ions through the membrane. The concentrated brine flows through at least the concentrate channel while a voltage difference is applied between the anode and cathode; and additional aqueous solution mixed with concentrated brine from the desalination system flows through the diluate channel such that the proportion of aqueous solution in the flow into the diluate channel is lower than 0.61 or greater than 0.81.

In particular embodiments, the aqueous solution is seawater or concentrated brine from desalination plants. In additional embodiments, the concentrated brine flows along with seawater through the diluate channel to form a combined total diluate flow. In exemplary embodiments, the ratio of aqueous solution to the combined total diluate flow of aqueous solution and concentrated brine can be in a range from 0.81 to 0.95. Additionally, the ratio of concentrated brine flowing in the diluate channel(s) to the concentrated brine flowing through the concentrate channels can be in a range from 0.3 to 81. Where the other desalination system is a reverse-osmosis system, the desalination system can include a reverse-osmosis stage that operates with seawater flowing in or with concentrated brine flowing in with an applied pressure of 7 to 15 MPa.

Where the aqueous saline composition a brine of seawater, the brine can have a salinity greater than 35 g/kg and no greater than 70 g/kg. In other embodiments, the aqueous saline composition comprises industrial waste water.

In additional embodiments, the voltage applied to the anode and cathode maintains a current density of 200-1,500 $A/m^2$ across the electrodialysis membrane; and, in particular embodiments, application of the voltage to the anode and cathode maintains a current density of 500-1,500 $A/m^2$ across the electrodialysis membrane.

In some embodiments, further-concentrated brine is extracted from the concentrate channel of the electrodialysis system and injected into a crystallizer (i.e., a system, such as an evaporator, that separates a brine into salt and water); and salt is crystallized from the further concentrated brine in the crystallizer.

In additional embodiments, an initial feed composition is directed through a desalination system that produces outputs of substantially pure water and a desalination brine that serves as the aqueous saline composition. Additionally, nano-filtration, ultra-filtration, or lime-softening can be employed to treat the aqueous solution before it is directed as the aqueous saline composition through the reverse-osmosis system. In other embodiments, nano-filtration, ultra-filtration, or lime-softening can be employed to treat the aqueous solution before it is directed through the electrodialysis system.

In further embodiments, further-concentrated brine, which may be enriched in monovalent ions, from the concentrate channel can be directed through a system selected from (a) a mechanical-vapor-compression system, (b) a multi-effect evaporator, (c) a membrane-distillation system, and (d) a counterflow-reverse-osmosis system to concentrate the further-concentrated brine still further.

In further embodiments, diluted brine, which is relatively monovalent-free, leaving the diluate channel may be sent for industrial use, such as in oil and gas applications or agricultural applications where monovalent-free water is desired. Alternatively, the diluted brine can be further treated with nano-filtration with the permeate passing through the nano-filtration membrane being free of divalent ions and the retentate retained on the nano-filtration membrane enriched in divalent ions. The divalent-free permeate can be recirculated back and mixed with seawater as feed to the reverse osmosis system. The retentate rich in divalent ions can be used for recovering minerals of calcium and magnesium.

In still further embodiments, the electrodialysis system is split into separate sub-systems in fluid communication with each other with some sub-systems exclusively having electrodialysis membranes that are not monovalent selective and others exclusively having monovalent selective cation exchange membranes.

The systems and methods described herein can be used to treat seawater and desalination brine to produce both pure water and a highly concentrated stream which can be used for salt production. Currently, achieving zero-discharge desalination is difficult. The system and methods described herein can reduce the cost of attaining zero-discharge desalination and also increase the cost effectiveness of salt production. We also envision that this approach will enable more-sustainable seawater desalination across the world, especially in parts of the Middle East that have a high demand for both water and salt.

Accordingly, the systems and methods can reduce the overall costs of brine concentration by hybridizing ED with another desalination technique and can facilitate a significant increase in the implementation of brine management and treatment for seawater desalination and other industrial waters.

Figure 1:
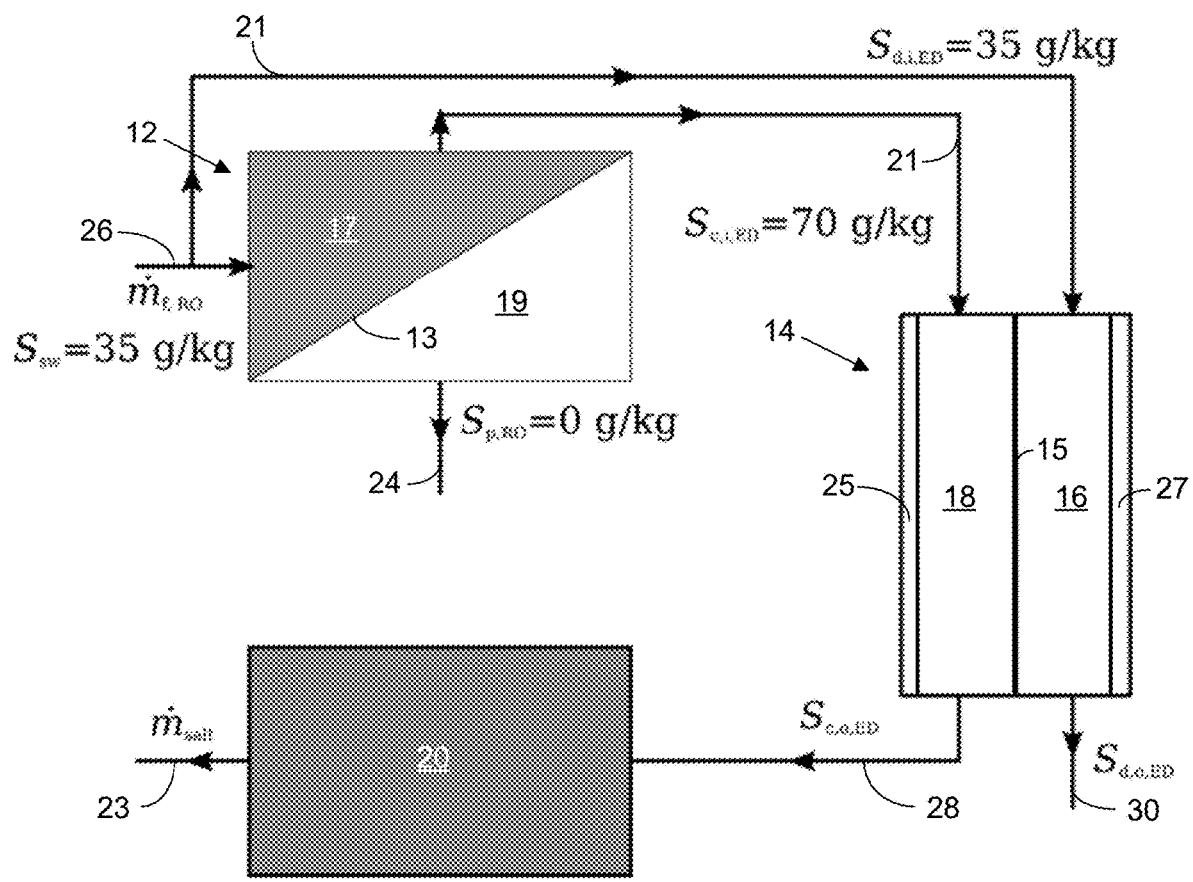
FIG. 1 is a block diagram showing a reverse-osmosis/electrodialysis (RO-ED) and crystallizer configuration for salt production.

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," means within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Figure 10:
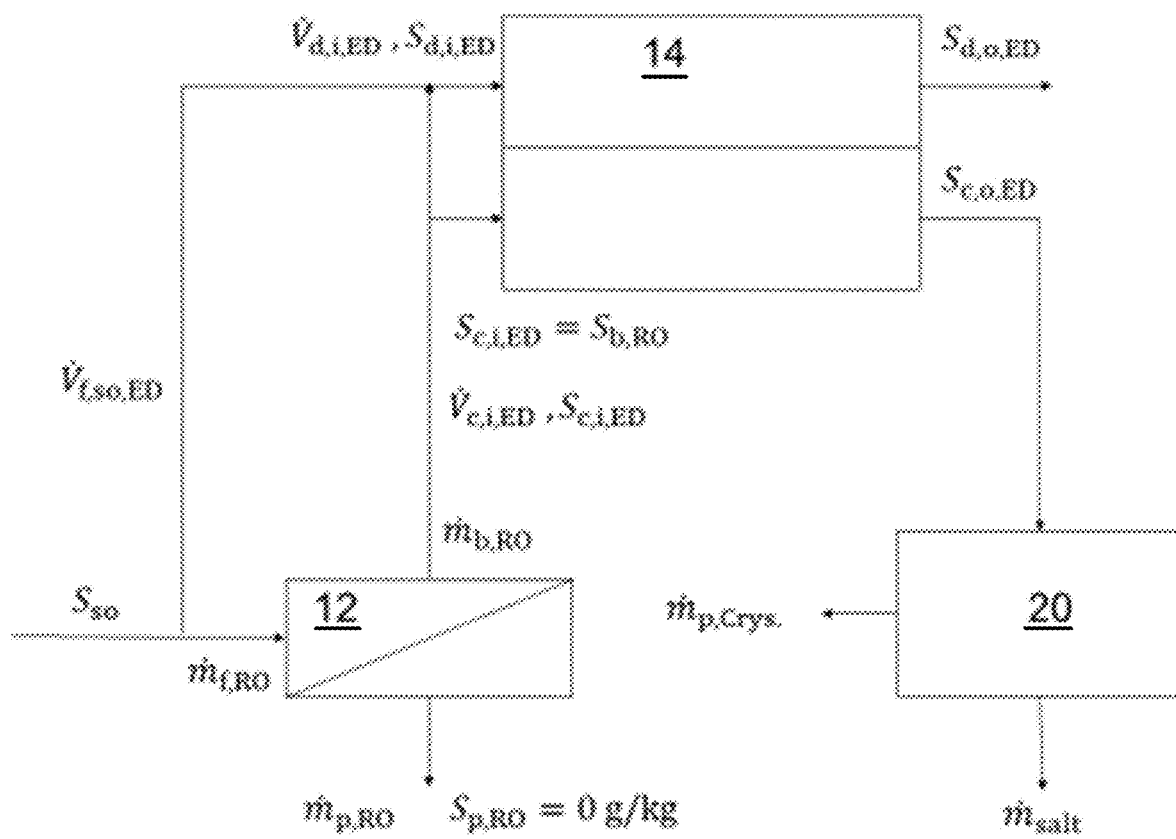
FIG. 10. is a schematic illustration of a generic flow configuration of a hybrid reverse-osmosis/electrodilaysis (RO/ED) brine concentration system.

Configurations:

In a first embodiment, a system including a reverse-osmosis (RO) system 12 (though another type of desalination system can be substituted for the RO system in other embodiments), an electrodialysis system (ED) 14, and a crystallizer 20 in a generic flow configuration for a salt-production focus is shown in the block diagram of FIG. 10. In each of the block diagrams provided in the Figures, the components schematically shown in blocks are coupled with one another via conduits to provide fluid communication of the liquids for flow along the paths shown via the arrows from one component to the next. In the system shown in FIG. 1, the focus is not on reducing the volume of the brine discharged overall but on increasing the production of salt while making the process more economical using RO and generating additional revenue by producing water.

As shown in FIGS. 1, 3, 6, and 7-9, aqueous solution from a source 26 is fed into an RO system 12 that produces substantially pure product water 24 on a permeate side 19 of an RO membrane 13 in the RO system 12 and a concentrated salty brine 21 on a retentate side 17 of the RO membrane 13. Moreover, though the Figures illustrate just one diluate channel 16 and one concentrate channel 18, each configuration can include a plurality of each type of channel 16 and 18 configured in a stack.

The electrodialysis (ED) system 14 can take a combination of aqueous solution 26 and concentrated brine from the RO system 21 at the inlet to the diluate channel(s) 16 in the stack while taking just the brine 21 from the RO system 12 at the inlet to the concentrate channel(s) 18 in the stack.

The further-concentrated brine 28 (with a salinity of around 200 g/kg in this embodiment), after passing through the concentrate channel(s) 18 and leaving the outlet of the concentrate channel(s) 18, is sent to a crystallizer 20 for the removal of the remaining water and the production of salt 23. Meanwhile, the diluate 30 extracted from the outlet of the diluate channel(s) 16 in the ED system 14, after flowing therethrough, has a salinity the same or substantially the same salinity as the aqueous solution feed 26, which, if the aqueous solution is seawater, facilitates its return to the sea without upsetting the local salinity levels of the sea.

Figure 5:
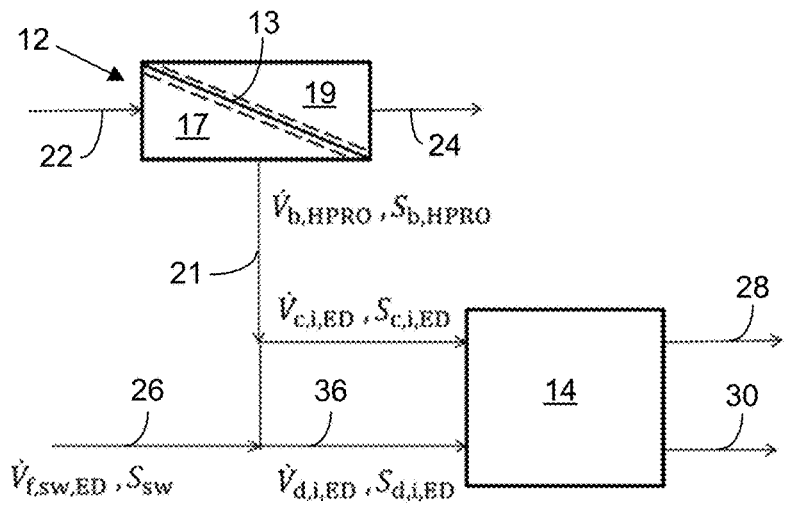
FIG. 5 is a schematic illustration of an embodiment of a high-pressure reverse osmosis and electrodialysis (HPRO-ED) system.

A configurable reverse-osmosis 12/electrodialysis 14 system that can be used for either of the above embodiments or for intermediate exemplifications (balancing these objectives) is shown in FIG. 5. Referring to the flows labeled in FIG. 5, the ratio of the flow of the diluate ($\dot{V}_{d,i,ED}$) to the flow of the concentrate ($\dot{V}_{c,i,ED}$) [i.e., the diluate/concentrate ratio (DCR)] through the electrically driven separation apparatus 14 can be expressed as follows:

$$DCR = \dot{V}_{d,i,ED} / \dot{V}_{c,i,ED}.$$

Meanwhile, the ratio of the flow of aqueous solution input ($\dot{V}_{f,so,ED}$) to the flow of the diluate, which together form a combined total diluate flow 36, through the diluate channel 16 can be expressed as follows:

$$SDR = \dot{V}_{f,so,ED} / \dot{V}_{d,i,ED}.$$

Depending on application, the SDR can be adjusted to obtain various flow configurations can be used for the hybrid reverse-osmosis/electrodialysis (RO/ED) brine concentration system. Two extreme ends of the flow configuration (SDR=1 and SDR=0) are discussed below. If the aqueous solution is seawater, SDR=1 is best for maximizing salt production, while SDR=0 is best for zero brine discharge seawater desalination.

In the system of FIG. 1, the aqueous solution can be seawater 26 (with a salt concentration of 35 g/kg in this particular embodiment), which is fed into an RO system 12 that produces substantially pure product water 24 on a permeate side 19 of an RO membrane 13 in the RO system 12 and a concentrated salty brine 21 (with a salt concentration of 70 g/kg in this particular embodiment) on a retentate side 17 of the RO membrane 13. In alternative embodiments, another aqueous solution (e.g., an industrial waste water) is used in place of the seawater in the methods described herein. The electrodialysis (ED) system 14 takes in seawater feed 26 (with 35 g/kg salinity in this particular embodiment) at the inlet to the diluate channel(s) 16 in the stack while taking the brine 21 from the RO system 12 at the inlet to the concentrate channel(s) 18 in the stack.

The further-concentrated brine 28 (with a salinity of 200 g/kg in this embodiment), after passing through the concentrate channel(s) 18 and leaving the outlet of the concentrate channel(s) 18, is sent to a crystallizer 20 for the removal of the remaining water and the production of salt 23. Meanwhile, the diluate 30 extracted from the outlet of the diluate channel(s) 16 in the ED system 14, after flowing therethrough, has a salinity of 35 g/kg in this embodiment (i.e., the same or substantially the same salinity as the seawater feed 26), which facilitates its return to the sea without upsetting the local salinity levels of the sea. In this configuration, all of the brine 21 from the RO system 12 is introduced as feed to the inlet of the concentrate channel(s) 18 of the ED system 14.

Figure 2:
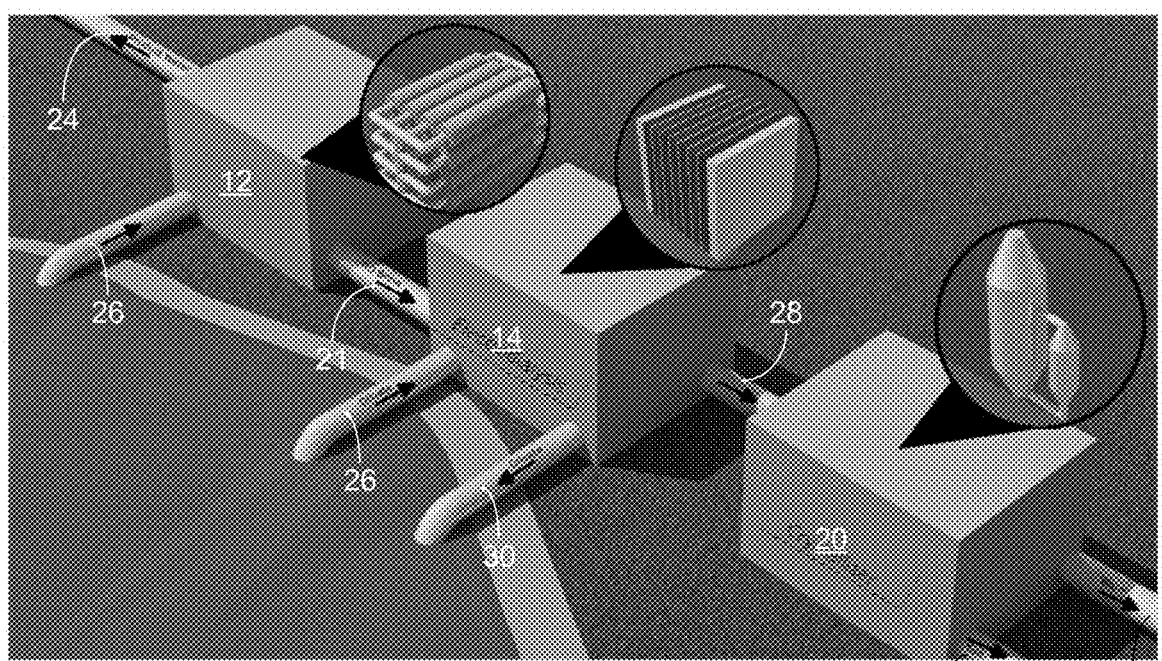
FIG. 2 is a rendered diagram showing a RO-ED and crystallizer configuration for salt production along with representations of sub-systems shown next to each block.

A rendered representation of a RO-ED-crystallizer (REC 12, 14, 20) configuration for salt production, with each sub-system represented next to each block, is shown in FIG. 2.

Figure 3:
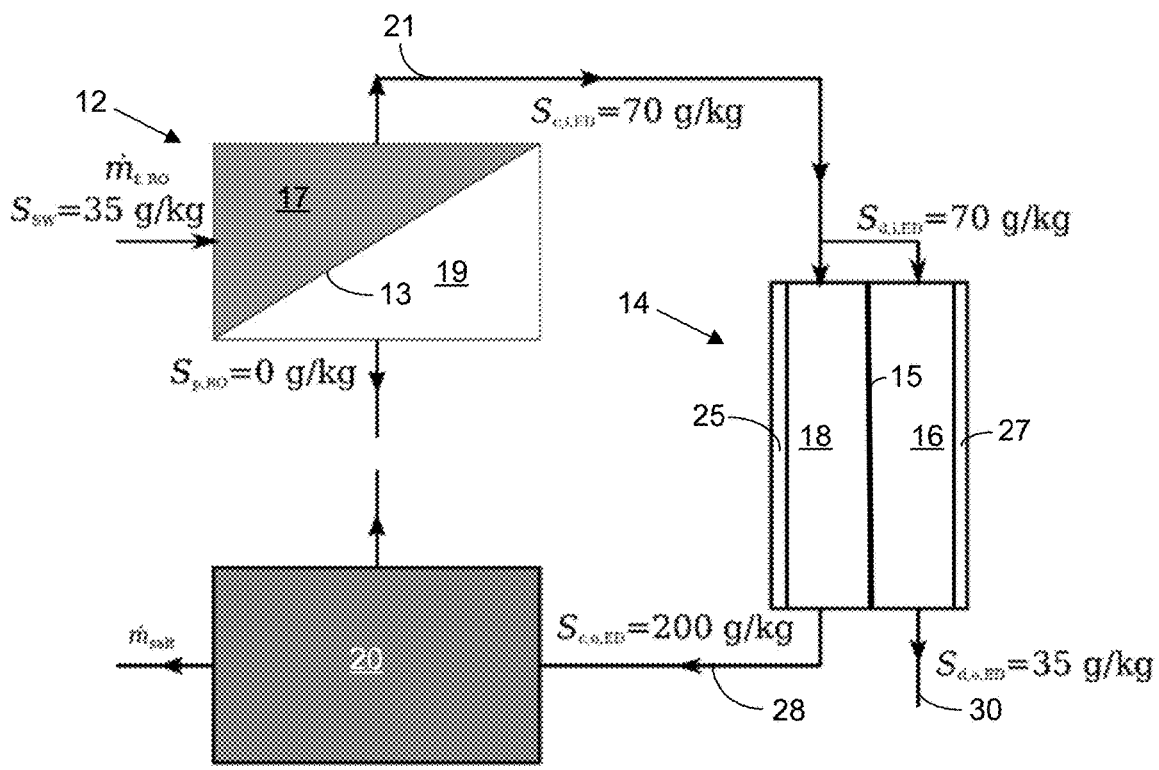
FIG. 3 is a block diagram showing a RO-ED and crystallizer configuration for zero-discharge desalination.

In a second embodiment, a RO/ED system with a crystallizer 20 configured for zero-discharge desalination is shown in the block diagram of FIG. 3. In a particular embodiment, the source feed 26 is seawater with a salinity of 35 g/kg. The seawater 26 is fed through an RO System 12, where a concentrated brine stream 21 (with a salinity of 70 g/kg in this embodiment) is extracted from a retentate side 17 of an RO membrane 13, while substantially pure water 24 is extracted from the permeate side 19 of the RO membrane 13. The concentrated brine 21 is then fed through both diluate and concentrate channels 16 and 18 in an ED system 14; and a diluted (diluate) stream (with a salinity of 35 g/kg) is extracted from the opposite end of the diluate channel 16, while a further-concentrate brine stream 28 is extracted from the opposite end of the concentrate channel 18 and fed to a crystallizer 20 to remove the remaining water and to precipitate salt crystals 23.

In this embodiment, the focus is on ensuring that the RO brine 21 is fully used for discharge purposes. The configuration prioritizes water production with supplementary revenue generated by producing salt 23 from crystallizing the further-concentrated brine output 28 from the concentrate channel 18 of the ED system. The main difference from the earlier configuration is that, in this second embodiment, the RO brine 21 feeds into both the diluate and concentrate channels 16 and 18 of the ED system 14. This dual feed of the brine 21 from the RO system 12 results in vastly different system sizes and cost than are found with the previously discussed configuration.

Figure 4:
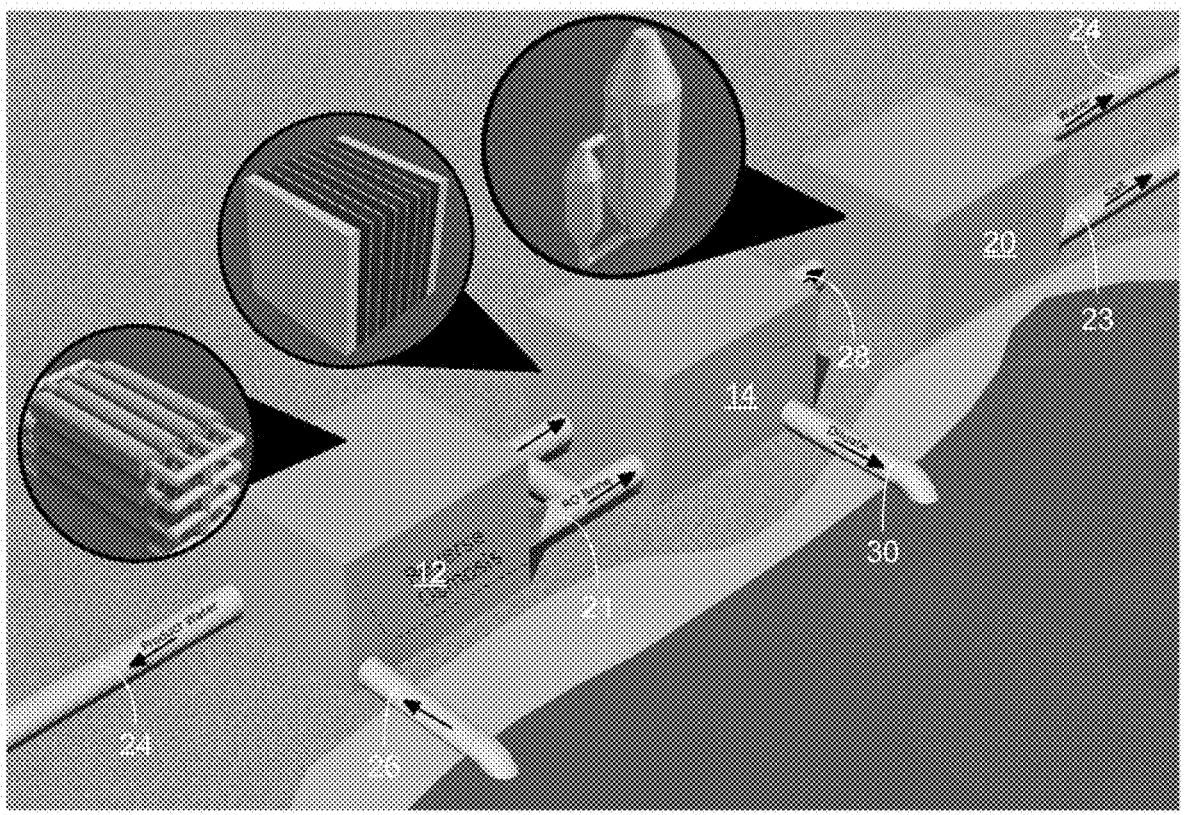
FIG. 4 is a rendered diagram showing a RO-ED and crystallizer configuration for zero-discharge desalination along with representations of sub-systems shown next to each block.

A rendered representation of a RO-ED-crystallizer (REC 12, 14, and 20) configuration for zero-discharge desalination with each sub-system represented next to each block is shown in FIG. 4.

In one exemplification using a high-pressure reverse-osmosis (HPRO)/ED system, as shown in FIG. 5, the HPRO system 12 is operated at a pressure of 70-150 bar (7-15 MPa), which is a higher pressure than is generally used for seawater RO. The salinity of the entering feed 22 in this embodiment is 35-70 g/kg, which is also greater than the typical salinity of seawater. A high-pressure RO brine discharge 21 is extracted from the retentate side 17 of the HPRO system 12 and fed through each of the concentrate and diluate channels 18 and 16 of an electrically driven separation apparatus 14 that includes at least one monovalent selective cation exchange membrane 15 and that is operated at a current density (i) of 200-1,500 A/m$^2$ such that the RO brine 21 is split between the diluate and concentrate channels 16 and 18 of the electrically driven separation apparatus 14 in a ratio of 6 to 80 (i.e., DCR=6-80) with the ratio of the flow of seawater feed 26 to the total diluate flow being 0.81 to 1 (i.e., SDR=0.81-1).

Figure 6:
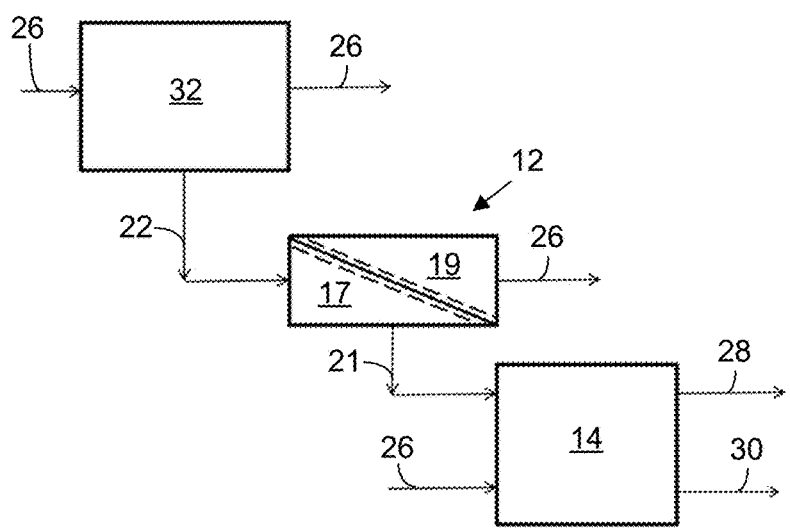
FIG. 6 is a schematic illustration of a HPRO-ED system with a SDR=1 (i.e., 100% of the electrodialysis (ED) diluate is directly from seawater feed; 0% of the ED diluate is from HPRO brine discharge).

The extreme case, where SDR=1, is shown schematically in FIG. 6. In this embodiment, the diluate flow 30 through the electrically driven separation apparatus 14 is entirely from seawater 26 (with no mixing of discharged brine 21 from the HPRO system into the flow through this channel). As shown therein, seawater 26 is initially introduced (with a salt concentration of 35-40 g/kg) into an initial water-separation device 32, such as a seawater reverse-osmosis (SWRO) system, a multi-stage-flash (MSF) system, a multiple-effect-distillation (MED) system, or a mechanical-vapor-compression (MVC) system, wherein the initial water-separation device 32 produces outputs of substantially pure water 24 from the diluate channel and desalination brine 22 (with a salt concentration of 50-70 g/kg) from the concentrate channel. That desalination brine 22 is then fed through a high-pressure reverse osmosis (HPRO) system 12 that outputs additional substantially pure water 24 from the permeate side 19 of the HPRO system and a concentrated desalination brine 21 with a still-greater salt content from the retentate side 17 of the HPRO system 12. The concentrated desalination brine 21 is then fed through the concentrate channel 18 of an electrodialysis (ED) system 14, while seawater 26 (with a salt concentration of 35-40 g/kg) is passed through the diluate channel 16 of the ED system 14. The ED system 14 then outputs a further-concentrated desalination brine 28 from the concentrate channel 18, which is fed to a crystallizer 20 that outputs a crystalline salt 23.

Figure 7:
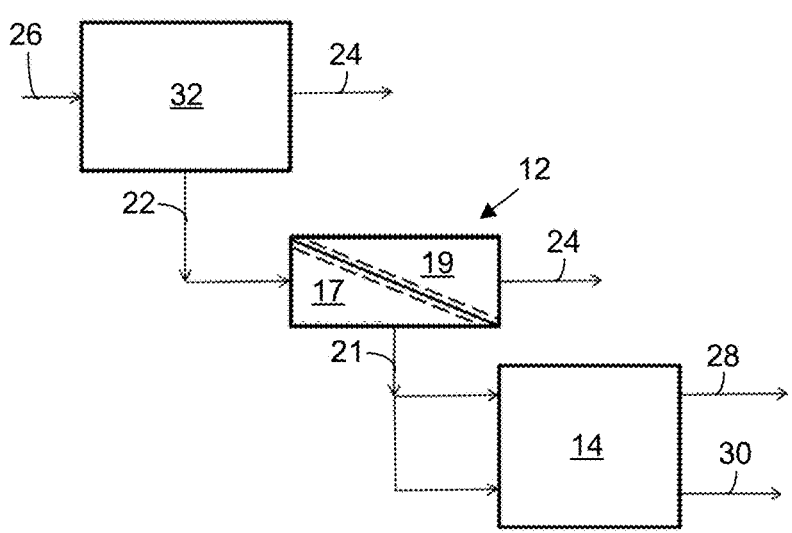
FIG. 7 is a schematic illustration of a HPRO-ED system with a SDR=0 (i.e., 0% of the ED diluate is directly from seawater feed; 100% of the ED diluate is from HPRO brine discharge).
Figure 8:
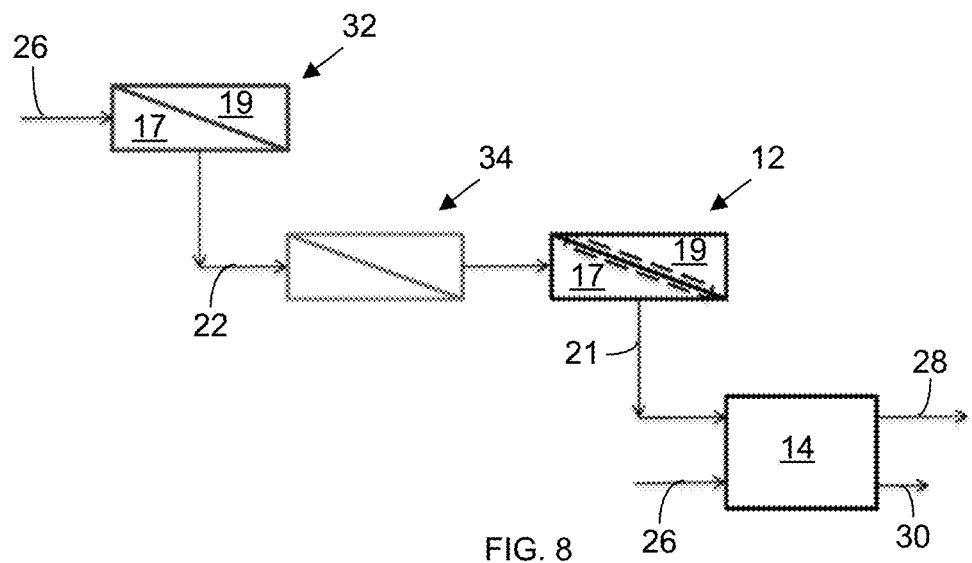
FIG. 8 is a schematic illustration of a seawater RO (SWRO)-HPRO-ED system with a pre-treatment step upstream from the HPRO system, wherein the pre-treatment, in this embodiment, is a nanofiltration system.

The opposite extreme with a SDR=0 is schematically shown in FIG. 7, wherein all channels of the electrically driven separation apparatus 14 are fed from the desalination brine 21 of the HPRO system 12 (with a salt content of 50-70 g/kg) from a seawater feed 26 (with a salt content of 35-40 g/kg) without any direct feed of seawater 26 into the electrically driven separation apparatus 14. Generally, for applications with a focus on salt production, the SDR will be in a range of 0-0.61.

Figure 9:
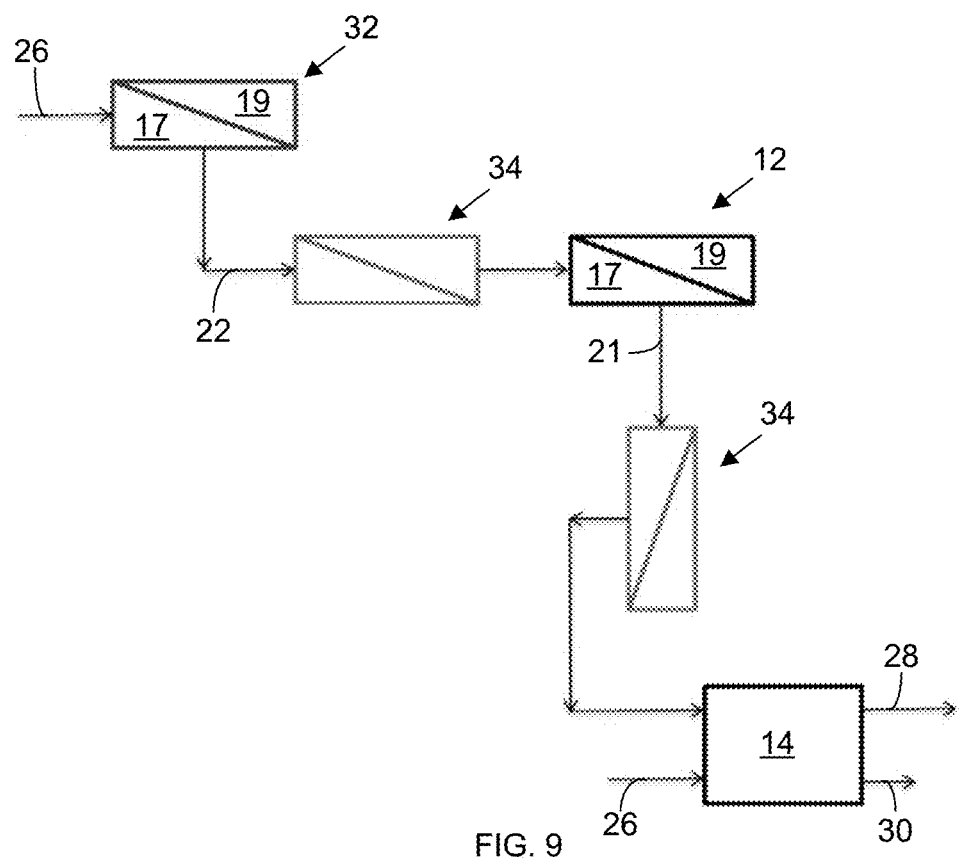
FIG. 9 is a schematic illustration of a HPRO-ED system with a nanofiltration system between the SWRO and HPRO systems and another nanofiltration system between the HPRO and ED systems.

In additional embodiments, a softening or pre-treatment step/apparatus 34, such as nano-filtration (NF), as shown in FIG. 7, or lime-softening can be applied to the HPRO brine discharge 21 before it enters the concentrate stream 28 of the electrically driven separation apparatus 14. In further embodiments, a pretreatment step 34 utilizing seawater RO (SWRO) or a combination of SWRO and nanofiltration can be employed to treat the seawater 26 before and after it is injected into the high-pressure reverse osmosis (HPRO) system 12, as shown in FIG. 9.

The concentrated brine 28 produced by the electrically driven separation apparatus 14 is further concentrated by any of (a) a mechanical vapor compression system, (b) a multi-effect evaporator, (c) a membrane distillation system, and/or (d) a counterflow RO (CFRO, also referred to as osmotically assisted reverse osmosis) system.

In additional embodiments, the electrically driven separation apparatus 14 can be split into separate sub-systems in fluid communication with each other with some sub-systems exclusively having conventional electrodialysis membranes and others exclusively having monovalent selective electrodialysis membranes.

In further embodiments, further-diluted brine is extracted from the diluate channel of the electrically driven separation apparatus 14, wherein the further-diluted brine has a reduced concentration of monovalent ions for use in agricultural applications, such as in farming, in greenhouses for plants and for use in industrial applications including but not limited to oil and gas fields for injection into wells in oil and gas extraction.

In additional embodiments, further-diluted brine is extracted from the diluate channel of the electrodialysis system and directed through a nanofiltration system that separates the diluted brine into a permeate stream with a majority of monovalent ions and a retentate stream with a majority of non-monovalent ions. The retentate stream from the nanofiltration system can be fed to other industrial facilities in need of monovalent-free waters, such as a mineral recovery plant for recovering salts of calcium and magnesium or oil and gas drilling sites in need of monovalent-free water. The permeate, which has a majority of monovalent ions and is sparse in divalent ions, can be mixed with the aqueous solution and recirculated back to the desalination system.

These methods can be combined to achieve zero liquid discharge desalination.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, ¾th, ⅘th, 9/10th, 19/20th, 49/50th, 99/100th, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for concentrating aqueous solutions, comprising:
    directing an aqueous solution through a desalination system that separates the aqueous solution into purified water and concentrated brine;
    directing the concentrated brine into an electrodialysis system comprising an anode and a cathode and at least two monovalent selective ion exchange membranes between the anode and the cathode, wherein at least one of the monovalent selective ion exchange membranes separates at least one diluate channel with a comparatively diluted ion concentration from at least one concentrate channel with a comparatively concentrated ion concentration in the electrodialysis system, wherein each monovalent selective ion exchange membrane selectively allows at least one monovalent ion to pass through the membrane while blocking or significantly inhibiting the transport of multi-valent ions through the membrane;
    flowing the concentrated brine through at least the at least one concentrate channel while applying a voltage to the anode and cathode; and
    flowing additional aqueous solution mixed with concentrated brine from the desalination system through the at least one diluate channel such that the proportion of aqueous solution in the flow into the at least one diluate channel is lower than 0.61 or greater than 0.81, and wherein the ratio of the flow through the at least one diluate channel to the flow through the at least one concentrate channel is in a range from 0.3 to 81.

2. The method of claim 1, wherein the desalination system is a reverse-osmosis system, comprising a reverse-osmosis membrane in a chamber; wherein purified water is passed through the membrane to a permeate side of the chamber; and wherein dissolved solutes are retained in the concentrated brine as retentate on an opposite side of the membrane upstream from the purified water and removed from the chamber.

3. The method of claim 2, wherein the aqueous solution is seawater.

4. The method of claim 3, wherein the aqueous solution flowing to system and the aqueous solution flowing to the diluate channels are of the at least one diluate channel have different salinity concentrations.

5. The method of claim 2, wherein the proportion of aqueous solution in the flow into the at least one diluate channel is in a range from 0.81 to 0.95.

6. The method of claim 2, further comprising directing an initial feed composition through a preliminary desalination system that produces outputs of substantially pure water and a desalination brine that serves as the aqueous solution.

7. The method of claim 2, wherein the aqueous solution is seawater, and wherein the concentrated brine has a salinity greater than 35 g/kg and no greater than 70 g/kg.

8. The method of claim 1, wherein the desalination system includes a high-pressure reverse-osmosis stage that operates with the aqueous solution flowing in or the concentrated brine flowing in at a pressure of 7 to 15 MPa on the feed side of the high-pressure reverse-osmosis membrane.

9. The method of claim 1, wherein the aqueous solution comprises industrial waste water.

10. The method of claim 1, wherein the application of the voltage to the anode and cathode maintains a current density of 200-1,500 A/m$^2$ across the monovalent selective ion exchange membrane.

11. The method of claim 1, wherein the application of the voltage to the anode and cathode maintains a current density of 500-1,500 A/m$^2$ across the monovalent selective ion exchange membrane.

12. The method of claim 1, further comprising:
    extracting further-concentrated brine from the at least one concentrate channel of the electrodialysis system;
    injecting the further concentrated brine into a crystallizer; and
    crystallizing salt from the further concentrated brine in the crystallizer.

13. The method of claim 1, further comprising employing nano-filtration, ultra-filtration, or lime-softening to treat the aqueous solution before it is directed through the desalination system.

14. The method of claim 1, further comprising employing nano-filtration, ultra-filtration, or lime-softening to treat the aqueous solution before it is directed through the electrodialysis system.

15. The method of claim 1, further comprising extracting further-concentrated brine from the at least one concentrate channel of the electrodialysis system and directing the further-concentrated brine through a system selected from any of (a) a mechanical-vapor-compression system, (b) a multi-effect evaporator, (c) a membrane-distillation system, and (d) a counterflow-reverse-osmosis system to concentrate the further-concentrated brine still further.

16. The method of claim 1, wherein the electrodialysis system is split into separate sub-systems in fluid communication with each other with some sub-systems exclusively having electrodialysis membranes that are not monovalent selective and other sub-systems exclusively having monovalent selective ion exchange membranes.

17. The method of claim 1, further comprising extracting further-diluted brine from the at least one diluate channel of the electrodialysis system, wherein the further-diluted brine has a reduced concentration of monovalent ions.

18. The method of claim 1, further comprising extracting further-diluted brine from the at least one diluate channel of the electrodialysis system and directing the further-diluted brine through a nanofiltration system that separates the diluted brine into a permeate stream that is richer in monovalent ions than a retentate stream that is richer in non-monovalent ions than the permeate stream.

19. The method of claim 18, wherein the retentate stream from the nanofiltration system is fed to another industrial facility in need of monovalent-free waters.

20. The method of claim 18, wherein the permeate stream has a majority of monovalent ions and is comparatively sparse in divalent ions is mixed with the aqueous solution and recirculated back to the desalination system.

21. The method of claim 18, further comprising extracting further-concentrated brine from the at least one concentrate channel of the electrodialysis system and directing the further-concentrated brine through a system selected from (a) a mechanical-vapor-compression system, (b) a multi-effect evaporator, (c) a membrane-distillation system, and (d) a counterflow-reverse-osmosis system to concentrate the further-concentrated brine still further and to achieve zero liquid discharge desalination, wherein the retentate stream from the nanofiltration system is fed to other industrial facilities in need of monovalent-free waters, and wherein the permeate stream has a majority of monovalent ions and is comparatively sparse in divalent ions is mixed with the aqueous solution and recirculated back to the desalination system.

\* \* \* \* \*

UNITED STATES PATENT AND TRADEMARK OFFICE
CERTIFICATE OF CORRECTION

PATENT NO. : 10,626,037 B2
APPLICATION NO. : 16/117471
DATED : April 21, 2020
INVENTOR(S) : John H. Lienhard et al.

Page 1 of 1

It is certified that error appears in the above-identified patent and that said Letters Patent is hereby corrected as shown below:

In the Claims

In Claim 4, at Column 10, Line 8, add --the reverse-osmosis-- between "flowing to" and "system".

In Claim 4, at Column 10, Line 9, remove "diluate channels are of the" between "flowing to the" and "at least one diluate channel".

Signed and Sealed this
Ninth Day of June, 2020

Andrei Iancu
*Director of the United States Patent and Trademark Office*